(12) United States Patent
Fenile

(10) Patent No.: US 12,246,921 B2
(45) Date of Patent: Mar. 11, 2025

(54) TRANSPORTATION DEVICE

(71) Applicant: FERAG AG, Hinwil (CH)

(72) Inventor: Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 239 days.

(21) Appl. No.: 17/944,787

(22) Filed: Sep. 14, 2022

(65) Prior Publication Data

US 2023/0113012 A1    Apr. 13, 2023

(30) Foreign Application Priority Data

Oct. 8, 2021 (CH) .................................. 70371/2021
Jun. 3, 2022 (CH) .................................. 00689/2022

(51) Int. Cl.
*B65G 13/10* (2006.01)

(52) U.S. Cl.
CPC .................................. *B65G 13/10* (2013.01)

(58) Field of Classification Search
CPC ......... B65G 13/10; B65G 23/44; B65G 13/12
USPC ...................................................... 198/369.5
See application file for complete search history.

(56) References Cited

U.S. PATENT DOCUMENTS

| | | | |
|---|---|---|---|
| 4,405,451 A * | 9/1983 | Roman | B03B 1/02 209/147 |
| 7,490,712 B2 * | 2/2009 | Hamers | B65G 47/642 198/588 |
| 8,851,275 B2 * | 10/2014 | Tsai | B65H 31/3009 198/594 |
| 10,259,663 B2 * | 4/2019 | Heuft | B65G 47/268 |
| 11,458,509 B2 * | 10/2022 | Schulzki | B07C 5/362 |
| 2007/0012545 A1 * | 1/2007 | Varney | B65G 13/10 198/370.04 |
| 2011/0005894 A1 | 1/2011 | Tsai | |
| 2019/0079052 A1 | 3/2019 | Nicolini et al. | |

FOREIGN PATENT DOCUMENTS

| | | |
|---|---|---|
| DE | 200 04 434 U1 | 5/2000 |
| DE | 20 2010 008 970 U1 | 2/2011 |
| DE | 10 2010 044 239 A1 | 10/2011 |

(Continued)

*Primary Examiner* — Gene O Crawford
*Assistant Examiner* — Lester Rushin, III
(74) *Attorney, Agent, or Firm* — Pauley Erickson & Swanson

(57) ABSTRACT

A transport device for transporting bulk products includes a fixed supply portion and a fixed discharge portion which is arranged downstream in a conveying direction and an ejection device including a first and second ejection unit which are arranged in the conveying direction. The first ejection unit includes a fixed or movable end which is arranged adjacent to the fixed supply portion and a movable end which is arranged downstream thereof, and the second ejection unit includes a movable end which is arranged adjacent to and downstream of the first ejection unit and a fixed or movable end which is arranged downstream thereof adjacent to the fixed discharge portion, wherein the first and second ejection unit each include a drive unit for independently driving the respective ejection unit and by moving apart the movable end of the first ejection unit and the movable end of the second ejection unit forms a gap through which bulk products are ejected from the transport device.

19 Claims, 8 Drawing Sheets

(56) References Cited

FOREIGN PATENT DOCUMENTS

| | | |
|---|---|---|
| EP | 0 124 177 A1 | 11/1984 |
| EP | 1 860 043 A1 | 11/2007 |
| JP | 2000288234 A * | 10/2000 |
| WO | WO 2011/021056 A1 | 2/2011 |
| WO | WO 2018/055465 A1 | 3/2018 |

* cited by examiner

TRANSPORTATION DEVICE

CROSS-REFERENCE TO RELATED APPLICATIONS

Swiss Patent Application No. 07037/2021, filed 8 Oct. 2021 and Swiss Patent Application No. 00689/2022, filed 3 Jun. 2022, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present invention relates to the field of conveying technology and it relates to a transport device for transporting and spacing apart bulk products.

Discussion of Related Art

During the further processing, picking and packaging of bulk products, the automatic conveying of bulk products is important, Conveyor systems, in particular roller or belt conveyors, are distinguished in this case inter alia in that they allow a space-saving sorting and a time-efficient incoming or outgoing transport of bulk products. Depending on the downstream method step, in addition to the efficient transport of bulk products, an additional important requirement placed on transport devices is allowing bulk products to be spaced part or ejected.

In order to eject bulk products from a flow of bulk products, ejection devices are already known. Thus, for example, there are known for further distributing the ejected articles ejection devices in which a switch is provided inside a curved arc. These switches typically comprise an adjustable guiding element in the form of a switch tongue which is pivotably supported, wherein it is directed obliquely counter to the conveying stream with the front end thereof. During pivoting, the switch tongue releases one of the two outlets and blocks the other outlet with the respective side flank which is in the form of a guiding face. Such a device is disclosed, for example, in DE20004434U1.

The publication DE20004434U1 discloses a curved-path ejector in which in a curve of a conveying path a switch is configured with a pivotable switch tongue which comprises lateral guiding faces and which guides the incoming transport path optionally to an outlet which is radially internal or radially external with respect to the curve.

Alternatively, to curved-path ejection devices, roller ejectors are known, wherein bulk products are ejected by means of a number of rollers which are generally arranged in at least two groups. Each of the groups has a common orientation along a main rotation axis relative to a main conveying direction. Typically, one group can be orientated through 45° to the left relative to the main conveying direction while the second group is orientated through 45° to the right. Conveyed products can be conveyed by this ejector straight-ahead, 45° to the left or right and 90° to the left or right. Such a device is disclosed in DE102010044239A1.

The publication DE102010044239A1 discloses an ejector for conveyors which comprises a number of rollers which are arranged in at least two groups, wherein each group has a common orientation of a main rotation axis relative to a main conveying direction and the main rotation axes of at least two groups are located at an angle relative to each other and wherein both groups can be driven and controlled separately.

SUMMARY OF THE INVENTION

During the transport of bulk products in a transport device, the bulk products must often be delivered for subsequent processes in a precise position or at a precise time. Often, however, the bulk products are not discharged or supplied in a precisely timed manner from an upstream process. Consequently, it must be possible within the transport device for discontinuously supplied bulk products to be brought into a continuous flow of products in which the bulk products are transferred at a precise time at the end of the transport device with a predetermined desired spacing from each other. Consequently, simply ejecting bulk products is often insufficient because it is also further necessary to space apart the bulk products relative to each other at a desired spacing.

For example, there may be arranged at the downstream end of the transport device a tray conveyor which is operated at a constant speed and the conveying trays of which predetermine the timing for the supply of the individual bulk products so that each of the bulk products can be supplied to one of the conveying trays. To this end, a uniformed desired spacing is necessary in order to be able to ensure that one bulk product is supplied per conveying tray. If spacings of individual bulk products from each other are too tight, therefore, it may become necessary to eject individual bulk products selectively in order to prevent two or more bulk products from being simultaneously transferred to the subsequent process. At the same time, however, no excessively large gaps are intended to remain between the bulk products in order to ensure that no trays remain unused. In order to prevent products from falling out of the transport device in an undesirable manner, the bulk products must further be transferred at a transfer location in a precisely positioned manner so that the respective bulk product can be transferred precisely into a conveying tray.

Therefore, an object of the invention is to allow a precisely timed transfer of bulk products to a downstream process and to achieve a minimum spacing between the individual bulk products.

A preferred variant of the transport device for transporting bulk products comprises a fixed or movable supply portion and a fixed or movable discharge portion which is arranged downstream in a conveying direction. The term "fixed" is intended to be understood in this context to mean that the respective supply or discharge portion is arranged as a whole in a fixed manner, therefore statically. However, individual elements, particularly elements for transporting and for conveying bulk products, are arranged in a movable manner in this instance. Thus, the fixed or movable supply and discharge portion can, for example, be in the form of roller or belt conveyors, wherein the rollers or the belt is/are arranged in a movable manner. The term "conveying direction" is intended to be understood in this instance to be the active direction of the flow of bulk products. Typically, conveying is always carried out only in one direction. In order to be able to empty the transport device in the event of problems which occur in the downstream process, the conveying direction can be reversed both in the supply portion and in the discharge portion.

In order to eject individual bulk products or a plurality of bulk products from the transport device in a selective manner, the transport device comprises an ejection device.

The ejection device comprises a first and a second ejection unit which are arranged in the conveying direction between the fixed or movable supply portion and the fixed or movable discharge portion. In this case, the first and second ejection units are preferably arranged in such a manner that they adjoin the fixed or movable supply portion or discharge portion, respectively.

Conventionally, however, the first ejection unit and a second ejection unit are not physically coupled directly but instead there is a spacing between the fixed or movable supply and discharge portion and the ejection device which is arranged therebetween.

Optionally, it is also possible to arrange additional modules, for example, additional transport or sorting modules or switches, between the supply portion and discharge portion and the ejection device. If problems occur, the conveying direction of the ejection device can be reversed. Thus, the bulk products which are already on the discharge portion can be supplied back to the ejection device and ejected thereby.

In order to be able to eject bulk products in the conveying direction, the first ejection unit comprises a fixed or movable end which is arranged adjacent to the fixed or movable supply portion and a movable end which is arranged downstream thereof. The movable end allows the ejection unit to be shortened in the conveying direction, whereby a gap in the conveying direction can be generated. Similarly to the first ejection unit, the second ejection unit comprises a movable end which is arranged adjacent to and downstream of the first ejection unit and a fixed or movable end which is arranged downstream thereof and adjacent to the fixed or movable discharge portion.

The closed state is defined as the state in which the respective movable ends are arranged substantially adjacent to each other. Typically, a spacing remains in the closed state between the movable end of the first ejection unit and the movable end of the second ejection unit of from 5 mm to 50 mm, preferably from 5 mm to 20 mm. On the other hand, the open state is defined as the state in which the two movable ends are displaced in the direction of the respective fixed or movable end and are moved away from each other to the greatest extent relative to each other.

Alternatively, or additionally, instead of the fixed or movable supply portion and/or the fixed or movable discharge portion, which is arranged downstream in the conveying direction, an additional ejection device can be arranged. Thus, a plurality of ejection devices can be arranged in the conveying direction in a row adjacent to each other in order to be able to eject a plurality of bulk products one after the other.

Typically, the supply portion and discharge portion is in the form of a belt conveyor having a belt width of from 500 mm to 1000 mm. The bulk products to be transported preferably have a weight of from 0.5 kg to 25 kg, in particular from 1 kg to 10 kg. A typical area of application for the transport device is conveying bulk products for a downstream belt conveyor. In a preferred variant, the belt conveyor may comprise conveyor trays having a tray length of substantially from 500 mm to 1200 mm, preferably from 600 mm to 800 mm.

For this application, it must be ensured that the respective actual length on the discharge portion substantially corresponds to the tray length. The actual length corresponds to the actual length of the respective bulk product and the actual spacing between the bulk product and the bulk product which follows downstream. If this actual length is less than the desired length, typically the length of a tray of a tray conveyor, two bulk products can completely or partially fall in a tray in an undesirable manner. If the actual length exceeds the desired length, under some circumstances, trays are left empty, which has a negative effect on the efficiency of the transport device.

The bulk products are typically supplied in a discontinuous stream of products. The supplied bulk products conventionally have different dimensions, that is, widths and length dimensions. An effective length of the respective bulk product does not necessarily correspond in this instance to the dimensions, that is, length or width, of the bulk product, but instead to the actually measured length in the conveying direction depending on the position on the supply portion. The term "effective length" is intended to be understood to be the length measured in the conveying direction of the bulk product. During operation, it may be the case that two or more bulk products touch each other during supply or are even partially positioned one on the other. In these cases, at least one of the two bulk products should typically be ejected.

Unlike known devices of the generic type for ejecting bulk products which function, for example, with pushing members or switches, the ejection device according to the invention allows desired bulk products to be ejected even when there is no spacing between the conveyed bulk products. Thus, for example, as a result of the two movable ejection units which are driven separately from each other, it is possible to eject the central one of three bulk products which are directly adjacent to each other.

In order to be able to transport bulk products and to space apart the bulk products relative to each other, the first ejection unit comprises a conveyor belt and the second ejection unit comprises a conveyor belt, which can each be driven by means of a drive motor. The movable end of the first ejection unit and the movable end of the second ejection unit are each displaceable by means of a linear unit.

Since the circulating conveyor belt of the first and second ejection units is not generally able to be shortened, a redirection roller over which the respective conveyor belt runs can be arranged on the respective ejection unit in order to shorten the first and second ejection units. In order to shorten the transport surface of the respective ejection unit in the conveying direction, the respective redirection roller is displaced in the direction of the respective fixed or movable end with the conveyor belt which runs around it.

In order to prevent the conveyor belt from hanging down during shortening, each of the two ejection units preferably further comprises at least one counter-roller which is also displaced. Preferably, the respective redirection roller and the counter-roller are arranged on a common carriage which is arranged on the respective ejection unit so as to be displaceable in the conveying direction. This arrangement ensures that, when the carriage is displaced, the redirection roller and the counter-roller are each displaced equally, whereby a uniform tension of the conveyor belt is allowed in the closed, open and all intermediate states.

In order to achieve a degree of freedom of the control unit which is as high as possible, the first and second ejection units each comprise a drive unit for independently driving the respective ejection unit. By the movable end of the first ejection unit and the movable end of the second ejection unit being moved apart, a gap through which the bulk products which are intended to be ejected are ejected from the transport device can be generated. Preferably, the bulk products fall downward out of the transport device in this instance.

The fixed or movable end which is arranged adjacent to the fixed supply portion and the movable end, which is arranged downstream thereof, of the first ejection unit and the movable end which is arranged in an adjacent manner downstream of the first ejection unit and the fixed or movable end, which is arranged downstream thereof and adjacent to the fixed discharge portion, of the second ejection unit are in this case preferably arranged in a movable manner in the conveying direction. The movable ends of the respective ejection unit are in this case preferably displaceable parallel with the conveying direction. In order to calibrate the ejection device, the belt of the first and/or second ejection unit may comprise a marking which can be detected by means of a calibration sensor. Alternatively, or additionally, the drive motor of the first and/or second ejection unit may comprise a rotary encoder. A zero position of the ejection device can be approached by means of the marking and/or the shaft encoder.

In order to transport bulk products by means of the transport device and to space them apart, the bulk products are supplied by means of the fixed or movable supply portion. For controlling the ejection device, the effective length and the respective actual spacing of the bulk products on the fixed or movable supply portion in the conveying direction are established.

The ejection of at least one bulk product is carried out by means of the ejection device, wherein the movable end of the first ejection unit is displaced in the direction of the fixed or movable supply portion, and the movable end of the second ejection unit is displaced in the direction of the fixed or movable discharge portion, wherein the bulk products which are intended to be ejected are ejected from the transport device through a gap which is produced between the first and second ejection unit. The remaining bulk items are discharged by means of the fixed or movable discharge portion.

In order to prevent the bulk products which follow in the conveying direction and which are intended to remain in the transport device from also being ejected in addition to the bulk products which are intended to be ejected, the conveyor belt of the first ejection unit can be braked in order to decelerate the bulk products which are supplied from the fixed or movable supply portion for ejection, while the movable end of the first ejection unit is moved back in the direction of the fixed or movable supply portion. At the same time, the conveyor belt of the second ejection unit can be accelerated in order to discharge the remaining bulk products to the fixed or movable discharge portion while the movable end of the second ejection unit is moved back in the direction of the fixed or movable discharge portion.

Should the gap which is produced by ejecting a bulk product between the leading and the trailing bulk product become too large, the ejection device can be used to accelerate the bulk product which is following the ejected bulk product in order to reduce the spacing from the bulk product which precedes the ejected bulk product. To this end, the conveyor belt of the first ejection unit can already be accelerated during the ejection of the bulk product. It must simply be ensured that the movable ends of the ejection unit can be moved apart rapidly enough to allow the ejection.

When the movable ends are moved together after the ejection, the belt speed can—if necessary—be further increased in order to reduce the spacing between the two remaining bulk products to the desired extent. This applies similarly to the belt of the second ejection unit, which belt where applicable can be even further accelerated in order to reduce the spacing after the transfer of the subsequent bulk product.

If the actual spacing between two bulk products falls below the desired level, but the actual spacings of the bulk products which precede and follow the two bulk products are large enough to allow a correction to the desired actual spacing of the two bulk products, this correction can be carried out without any ejection only by selectively accelerating the preceding one of the two bulk products and decelerating the following bulk product.

If the actual spacing between two bulk products is too large, it can also be reduced by means of the ejection device according to the invention in a transposed manner.

In order to be able to control the two ejection units in a precisely timed manner on the basis of the temporal arrival of the respective bulk products on the supply portion, the transport device may comprise at least one sensor and a control unit which is connected to the sensor in communication terms, wherein the control unit is configured to control the acceleration and/or deceleration and the movement apart of the first and second ejection units. In this instance, the sensor is preferably arranged on the fixed or movable supply portion and configured to detect the effective length of the bulk products in the conveying direction and the actual spacing between a preceding bulk product and a bulk product which is following downstream in the conveying direction, respectively.

On the basis of the actual spacing between the bulk products, it is possible to calculate using the control unit whether one or more of the bulk products which are supplied is intended to be ejected. To this end, the sensor is configured to detect the dimensions of the bulk products and the respective position of the bulk products relative to each other on the fixed or movable supply portion. Typically, the sensor is a light barrier, a light grid, a laser grid or a camera.

In order to control the time of the movement apart of the first and second ejection unit accurately, the at least one sensor is configured to send data to the control unit which is connected to the at least one sensor in terms of communication.

The at least one sensor is typically configured to detect the effective length of a bulk product on the supply portion. Individual bulk products are usually ejected in the case of an excessively small actual spacing between the bulk products.

In a variant, the sensor can also identify bulk products which are arranged adjacent to each other or which are arranged one on the other.

In a variant, at least one control sensor can be arranged in the region of the movable end of the first and/or second ejection unit, which sensor is configured to monitor the ejection by, for example, detecting bulk products which are jammed between the first and second ejection units or which block this area for another reason.

According to another embodiment, the control sensor may be an optical sensor which, in addition to monitoring the ejection, can also further detect the number of ejected bulk products and more preferably a barcode or a QR code on the bulk product to be ejected. In the simplest case, by establishing the number of ejected bulk products, the number of remaining bulk products can be corrected by the control unit.

In the case of individually identifying the bulk products with a barcode, a QR code or another optically readable code, the correspondingly configured control sensor can further detect the ejected bulk product, identify it and transmit this information to the control unit.

If the bulk products are provided with an RFID label or another electronically readable label, this can also be used in order to identify the ejected bulk product by means of an additional control sensor.

The control unit is configured to control the respective drive motor on the basis of the data in order to accelerate and/or to decelerate the respective conveyor belt. In addition to controlling the respective drive motor in order to control the speed, the control unit can also control the respective movable ends. On the basis of the effective length of the bulk products, the control unit can control the linear units on the basis of the respective effective length in such a manner that, between the movable end of the first ejection unit and the movable end of the second ejection unit, a gap which is wide enough to eject the bulk products which are intended to be ejected can be generated.

The advantage of a gap which is adapted to the effective length of the bulk product is that the movable ends of the respective ejection unit are moved apart only to such an extent that the bulk product to be ejected can be ejected. This allows the movable ends to be able to be moved together more quickly subsequently than if the movable ends are moved up into the open position for each bulk product. The end position is intended to be understood in this instance to be the position of the two movable ends in which they are moved toward the respective fixed end.

As a result of the different acceleration of the respective conveyor belt of the first and second ejection units, during the transfer from the second ejection unit to the fixed or movable discharge portion, the bulk product has a greater actual spacing with respect to the bulk product which follows upstream than the actual spacing during the transfer from the fixed or movable supply portion to the first ejection unit. On the basis of the position detected by the sensor of the bulk products on the fixed or movable supply portion and by means of the data transmitted by the sensor, the control unit can control the drive motor of the first ejection unit. The control unit can control the drive motor in such a manner that the first ejection unit is decelerated in order to eject the bulk products which are intended to be ejected. Alternatively, or additionally, the control unit can control the respective linear unit by means of the data which are transmitted by the sensor in such a manner that the first and second ejection units are displaced for ejection so rapidly that the bulk products which are intended to be ejected fall downward through the produced gap as a result of the mass thereof in a manner driven by gravitational force.

In addition to the controllable ejection elements of the ejection device, the flow of bulk products can further be influenced by means of the fixed or movable supply and/or discharge portion. Thus, via a speed difference of the discharge portion relative to the supply portion, an additional spacing or shortening of the spacing can be achieved. To this end, the fixed or movable supply portion and/or the fixed or movable discharge portion are preferably in the form of belt conveyors with a defined conveying speed.

In order to achieve a simple and cost-effective construction of the transport device, the fixed or movable supply portion and/or the fixed or movable discharge portion can also be in the form of a roller conveyor or chute or may comprise it.

In order to allow the ejected bulk products also to be sorted in addition to simply being ejected, a sorting facility for transporting and sorting bulk products is provided. The sorting facility comprises at least one transport device which comprises, depending on the configuration, a fixed supply portion and a fixed discharge portion which is arranged downstream in a conveying direction. Alternatively, instead of a fixed supply and discharge portion, an additional transport device can also be arranged upstream and/or downstream. In a variant, the sorting facility comprises a plurality of transport devices which are arranged adjacent to each other in a row in the conveying direction.

The transport device comprises an ejection device which comprises a first and a second ejection unit. The first and the second ejection units each define a transport surface, wherein the first ejection unit comprises a fixed or movable end (first end) and a movable end (second end) which is arranged downstream thereof and the second ejection unit comprises a movable end (first end) which is arranged in an adjacent manner downstream of the first ejection unit and a fixed or movable end (second end) which is arranged downstream thereof.

The first and second ejection units each comprise a drive unit for independently driving the respective ejection unit. By displacing a movable end of the first ejection unit and a movable end of the second ejection unit, there can be generated a gap, through which bulk products which are intended to be ejected are ejected from the transport device. Preferably, the bulk product falls downward out of the transport device during ejection with respect to the transport surfaces. The ejected bulk product comes to rest on the sorting device and/or is sorted by the sorting device into at least one collection container.

In order to sort the ejected bulk products, the sorting facility further comprises a sorting device in order to sort the ejected bulk product. The sorting device comprises at least one movable sorting element and at least one collection container. In order to obtain a structure which is as compact as possible, the at least one collection container can be arranged under the transport device. Unlike the sorting facilities which are known in the prior art, the at least one collection container is not arranged beside the conveyor belts of the first and second ejection units but can instead be arranged underneath.

The transport device can be used either purely for spacing apart and ejecting bulk products and/or for use in a sorting facility. During use for transporting and spacing apart bulk products, the method typically comprises the following steps. After the bulk products have been supplied by means of the fixed supply portion or an upstream transport device, an effective length and/or the actual spacing of the bulk products on the fixed supply portion or the upstream transport device can be established. The ejection of at least one bulk product by means of the ejection device can be carried out in the event of an excessively great deviation of the actual length from a desired length. To this end, the movable end of the first ejection unit can be displaced in the direction of the fixed supply portion or the upstream transport device and the movable end of the second ejection unit can be displaced in the direction of the fixed discharge portion or the downstream transport device. The bulk product to be ejected can be ejected through a gap (6) which is thereby produced between the first and second ejection unit out of the transport device and the remaining bulk product can be discharged by means of the fixed discharge portion.

Preferably, the conveyor belt of the first ejection unit is decelerated in order to slow the bulk products which are supplied from the fixed supply portion in order to be ejected and the movable end of the first ejection unit is moved back in the direction of the fixed supply portion or the upstream transport device. At the same time, the conveyor belt of the second ejection unit can be accelerated in order to discharge the remaining bulk products to the fixed discharge portion and the movable end of the second ejection unit can be moved back in the direction of the fixed discharge portion or the downstream transport device.

The transport device can be arranged individually between a fixed supply and discharge portion or a plurality of transport devices which are arranged adjacent to each other in a row can be arranged in order to space apart bulk products and to sort them or to form a sorting facility in combination with a sorting device. A plurality of sorting facilities which are arranged adjacent to each other in a row in the conveying direction can be controlled and opened independently of each other. The sorting device which is arranged in the sorting facility can be in the form of several steps. Thus, a plurality of movable sorting elements can be arranged beside each other and/or one above the other with respect to the conveying direction in order to allow a multi-step sorting operation.

In order to sort the ejected bulk products into at least one collection container under the transport surfaces, the at least one movable sorting element comprises an edge. The edge of the at least one movable sorting element can be brought from a first position into a second position with respect to an apex which is arranged under the transport surfaces on a linear or curved path in order to sort the bulk products with respect to the conveying direction to one of the sides into at least one collection container. The edge preferably extends substantially parallel with the conveying direction and is also arranged under the transport surfaces.

The sorting device according to the invention can also be used in a state released from the sorting facility and the transport device.

In a variant, at least two flows of goods can be transported parallel with each other in the conveying direction by means of the transport device. Preferably, the bulk products of the at least two flows of goods are transported in this case in a manner offset relative to each other with respect to the conveying direction. As a result of the offset transport of two flows of goods relative to each other, between 40% and 60% more bulk products per time unit can be transported, ejected and sorted than in only one single flow of goods.

In a variant, the movable sorting element may be in the form of a sorting belt which is tensioned in the viewing direction of the conveying direction in a triangular manner. Since the sorting belt typically runs over rollers or cylinders, in the strict sense this is not a geometrically correct triangle. Since, however, it substantially corresponds to a triangle shape, for the sake of simplicity a triangle is spoken of below. In this case, the sides of the triangle preferably form sliding surfaces for the bulk products which are intended to be sorted. The term "viewing direction" is intended to be understood in this case to be a direction in the conveying direction.

A plane of section is produced in a notional section through the sorting facility perpendicularly to the conveying direction.

In a variant, the sorting belt sectioned through the plane of section defines a triangle in the plane of section. The sorting belt preferably runs around at least three rollers or cylinders, wherein at least one of the rollers or cylinders can be displaced on the linear or curved path from a first position into a second position.

Preferably, the rollers are displaced by means of a lever from one position into the other (from the first position into the second or vice versa), wherein the respective ends of the roller or cylinder are guided in this case in a guide or slotted member.

In order to produce the length compensation of the sorting belt, at least one of the rollers or cylinders can be displaced on a curved path from the first position into the second position. Alternatively, the belt may also be configured to be so expansible that the at least one roller or cylinder can be displaced from the first position into the second position on a linear path and the length compensation is carried out by expansion of the sorting belt.

By moving one of the edges with respect to the apex from the first position into the second position or vice versa from the second position into the first position, it is possible to adjust the side at which the bulk products are sorted via one of the sliding surfaces. The sorting belt itself may be able to be driven, alternatively it simply runs around the rollers or cylinders but is not driven. In the event that the sorting belt is not driven, the ejected bulk products slide down over the sorting belt and fall into at least one collection container.

At least one collection container, into which it is preferably possible to sort in a spatially separated manner, is typically required. Thus, at least one collection container can be subdivided by means of a separation wall. Alternatively, at least two collection containers can be arranged beside each other.

In the event that the sorting belt can be driven, the ejected bulk products are actively conveyed by means of the sorting belt into the at least one collection container. In order to establish the portion of the at least one collection container in which the ejected bulk products are sorted or alternatively in which of the at least two collection containers the ejected bulk products are sorted, it is possible to control the side at which the bulk products are sorted by moving one of the rollers or cylinders with respect to the apex from the first position into the second position depending on the configuration on a linear or curved path or alternatively substantially parallel with the base side of the triangle.

By displacing at least one of the rollers or cylinders with respect to the apex, the angles of the sides can be changed and the inclination of the sliding surfaces can thereby be controlled. In this case, the triangle is preferably arranged in the viewing direction of the conveying direction in such a manner that the base side is arranged under and preferably substantially parallel with the transport surfaces and the roller or cylinder which forms the tip of the triangle is arranged above the base side but also under the transport surfaces. In order to achieve a particularly space-saving construction, the at least two collection containers can be arranged adjacent to each other without a gap remaining between the collection containers.

Alternatively, the movable sorting element may be in the form of a pivotable prism in the viewing direction of the conveying direction. The prism may be pivotable in order to sort the bulk products with respect to the apex in order to sort the bulk products into a portion of the at least one collection container or alternatively into one of the at least two collection containers. In a variant, the prism is in the form of a triangle, preferably an equilateral triangle. The lateral faces of the triangle constitute sliding surfaces in this case. In order to achieve a particularly space-saving and selective sorting process, the prism can be pivoted at the same time as the ejection operation. In this instance, the bulk products which fall downwardly out of the ejection device are detected by the pivoting prism, slide down over the respective sliding surface and are further accelerated by the pivoting movement and ejected into one of the at least two collection containers. In a variant, the side face forms only one sliding surface and the bulk products which are intended to be sorted slide down in a manner driven by gravitational force and fall into the at least one collection container in this case.

In a variant, the pivotable prism is arranged rotatably about a rotation location in order to sort the bulk products.

In this case, the prism can be pivoted back and forth between the first position and the second position. Alternatively, the prism can also be rotated about the rotation location, wherein the edges of the prism run on a circular path and at least one of the edges runs through the apex during each ejection operation.

Alternatively, the movable sorting element may be in the form of a seesaw which can be pivoted with respect to the apex when the bulk products are ejected in order to sort the bulk products into one of the at least two collection containers. In this case, the seesaw can be pivoted with respect to a rotation location which is preferably arranged under the apex.

In order to achieve a particularly time-saving and selective sorting process, the seesaw can be pivoted at the same time as the ejection operation. In this case, the bulk products which fall downward out of the ejection device are detected by the seesaw which can be pivoted between the first position and the second position, slide down over one of the sliding surfaces of the seesaw and can be further accelerated by the pivoting movement of the seesaw and ejected into one of the at least two collection containers.

The seesaw can preferably be pivoted about the rotation location so as to rotate from the first position into the second position, wherein a first edge of the seesaw crosses the apex during pivoting from the first position into the second position or vice versa from the second position into the first position.

The different variants of the movable sorting element can all be configured in such a manner that the at least one edge of the movable sorting element runs through the apex on the path from the first position into the second position or from the second position into the first position.

During the displacement for transporting and sorting bulk products, the bulk products are preferably supplied to the sorting facility by means of the fixed supply portion or an upstream transport device.

Optionally, the respective effective length and/or the actual spacing of the bulk products can be established and at least one bulk product can be ejected by means of the ejection device. A movable end of the first ejection unit can be displaced in the conveying direction, preferably in the direction of the fixed supply portion or an upstream transport device. A movable end of the second ejection unit can be displaced in the conveying direction, preferably in the direction of the fixed discharge portion or a downstream transport device. The cargos which are intended to be ejected are ejected from the transport device through a gap which is produced between the first and the second ejection units, preferably in a downward direction.

In order to sort the ejected bulk products, an edge of the at least one movable sorting element is brought from a first position into a second position with respect to an apex arranged under the transport surfaces on a linear or curved path in order to sort the bulk products with respect to the conveying direction at one of the sides into one of the at least two collection containers. The bulk products which remain on the transport device and which are not ejected are discharged.

During ejection, the bulk products fall, preferably downward, out of the sorting facility with respect to the transport surfaces. In a variant, the movable sorting element is in the form of a sorting belt which in the viewing direction of the conveying direction defines a triangle, the sides of which form sliding surfaces. In this variant, the roller or cylinder of the triangle can be moved with respect to the apex from the first position into the second position, preferably substantially parallel with the base side of the triangle, in order to adjust the side at which the bulk products are sorted. The roller or cylinder can be laterally moved with respect to the apex in order to adjust the respective angle of the sides and thereby the inclination of the sliding surfaces. The bulk products can be sorted into one of the at least two collection containers after ejection by sliding down on one of the sliding surfaces.

In a variant, the movable sorting element may in the viewing direction of the conveying direction be in the form of a pivotable prism which is pivoted in order to sort the bulk products with respect to the apex in order to sort the bulk products into one of the at least two collection containers.

In an alternative variant, the movable sorting element may be in the form of a seesaw which is pivoted with respect to the apex when the bulk products are ejected in order to sort the bulk products into one of the at least two collection containers.

The described embodiments and variants of the sorting facility or the transport device and the ejection device can be used to carry out the method according to the invention. The above-described embodiments and variants of the method disclose at the same time correspondingly configured embodiments and variants of the facility and devices in order to carry out the method, and vice versa.

BRIEF DESCRIPTION OF SEVERAL VIEWS OF THE DRAWINGS

Aspects of the invention are explained in greater detail with reference to the embodiments shown in the following Figures and the associated description. In the drawings.

DESCRIPTION OF PREFERRED EMBODIMENTS

Figure 1:
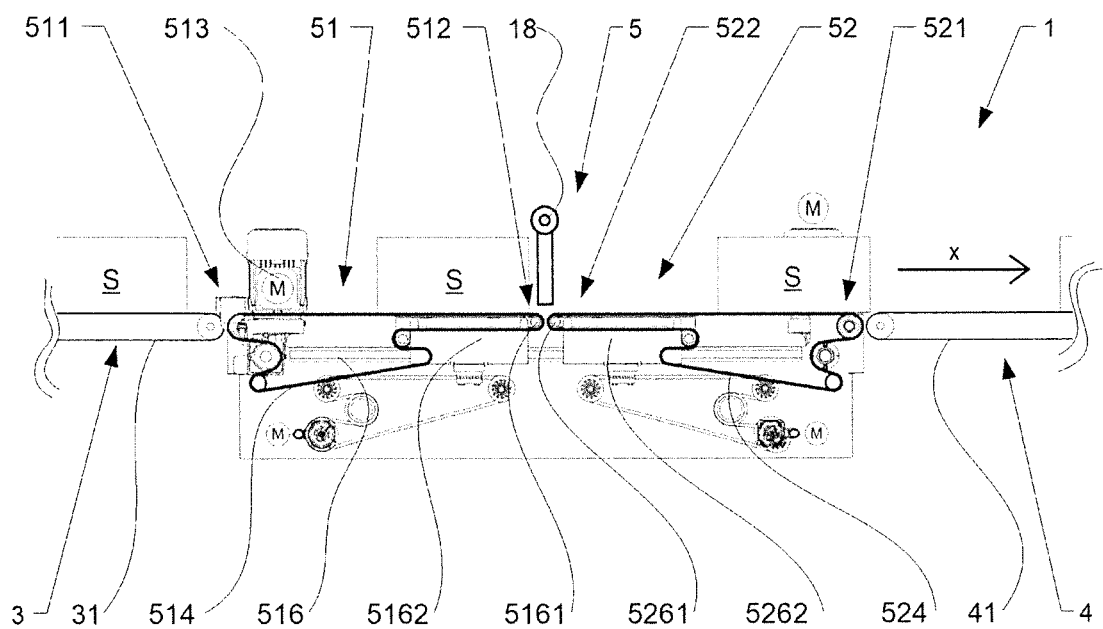
FIG. 1 shows a side view of a first variant of the transport device in a closed state.

As can be seen in FIGS. 1 to 4, the transport device 1 for transporting bulk products S comprises a fixed supply portion 3 and a fixed discharge portion 4 which is arranged downstream in a conveying direction x and an ejection device 5 comprising a first ejection unit 51 and a second ejection unit 52. The ejection device 5 is arranged in the conveying direction x between the fixed supply portion 3 and the fixed discharge portion 4.

The first ejection unit 51 comprises a fixed or movable end 511 which is arranged adjacent to the fixed supply portion 3 and a movable end 512 which is arranged downstream thereof. The second ejection unit 52 comprises a movable end 522 which is arranged downstream adjacent to the first ejection unit 51 and a fixed or movable end 521 which is arranged downstream thereof in a manner adjacent to the fixed discharge portion 4.

The first ejection unit 51 and the second ejection unit 52 each comprise a drive unit 513, 523 for independently driving the respective ejection unit 51, 52. By moving apart the movable end 512 of the first ejection unit 51 and the movable end 522 of the second ejection unit 52, a gap 6 through which the bulk products S which are intended to be ejected fall out of the transport device 1 in a downward direction can be generated.

The transport device 1 shown is suitable for a method for transporting and spacing apart bulk products S. As can be seen in all the Figures, the bulk products S are supplied by means of the fixed supply portion 3. The positions and the dimensions of the bulk products S are detected on the supply portion 3 by means of a sensor 7 on the fixed supply portion 3.

As can be seen in FIGS. 1 to 4, the first ejection unit 51 comprises a conveyor belt 514 and the second ejection unit 52 also comprises a conveyor belt 524 which can each be driven by means of the respective drive motor 513, 523. The movable end 512 of the first ejection unit 51 and the movable end 522 of the second ejection unit 52 are each arranged so as to be displaceable by means of a linear unit 515, 525.

Since the respective conveyor belt 514, 524 of the first ejection unit 51 and the second ejection unit 52 runs around and usually cannot be shortened, for shortening the first ejection unit 51 and the second ejection unit 52 in the variant shown a redirection roller 5161, 5261 is arranged on the respective ejection unit 51, 52. In this case, the respective conveyor belt 514, 524 runs around the redirection roller 5161, 5261.

In order to shorten the respective ejection unit 51, 52, the respective redirection roller 5161, 5261 is displaced with the conveyor belt 514, 524 which runs around it. In order now to prevent any occurrences of sagging of the respective conveyor belt 514, 524, each of the two ejection units 51, 52 preferably further comprises at least one counter-roller 5162, 5262 which is also arranged for displacement. Preferably, the respective redirection roller 5161, 5261 and the respective counter-roller 5162, 5262 are each arranged on a common carriage 516, 526. The carriages 516, 526 are preferably arranged in this case on the respective ejection unit 51, 52 so as to be displaceable in the conveying direction.

In order to detect the position and dimensions of the bulk products S and the position thereof on the supply portion 3, the variant shown of the transport device 1 comprises at least one sensor 7 and a control unit 900 which is connected to the sensor 7 in communication terms. The sensor 7 is configured to the dimensions of the bulk products S and the respective position of the bulk products S relative to each other on the fixed. Preferably, the sensor 7 is a light barrier, a light grid, a laser grid or a camera.

The control unit 900 is configured to control the acceleration and/or the deceleration and the movement apart of the first ejection unit 51 and the second ejection unit 52. A good flow of bulk products can be achieved if the fixed supply portion 3 and/or the fixed discharge portion 4 is/are in the form of belt conveyors 31, 41 with an adjustable conveying speed. Consequently, in addition to the ejection by means of the ejection device 5, the actual state of the bulk products S relative to each other can also be further influenced with the supply portion 3 and discharge portion 4.

Figure 2:
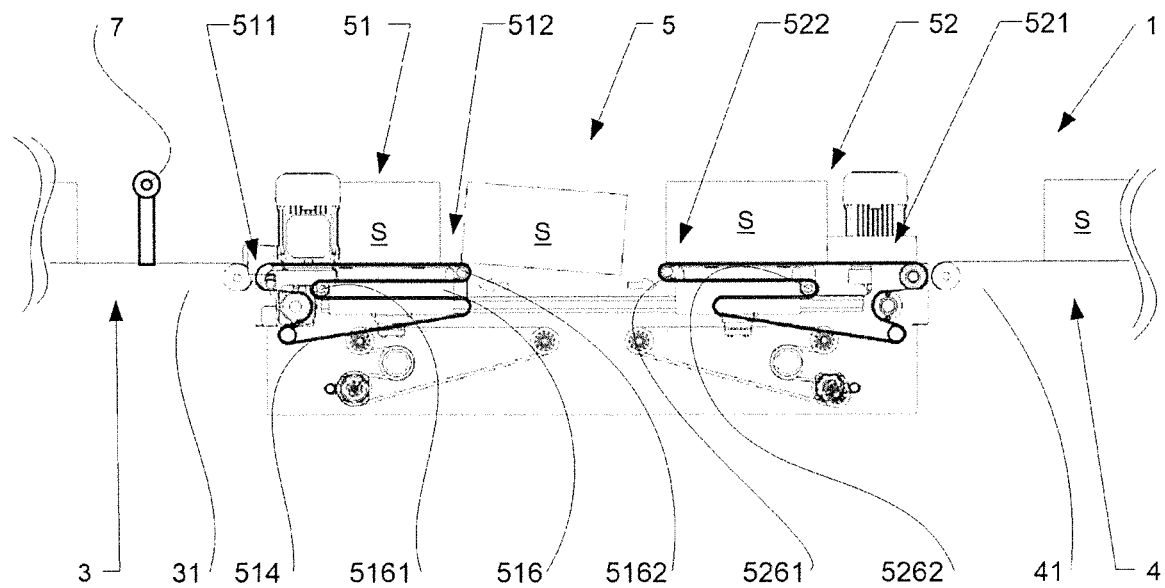
FIG. 2 shows a side view of the variant of the transport device according to FIG. 1 in a state when the movable end of the first ejection unit and the movable end of the second ejection unit are moved apart.

As can best be seen in FIG. 2, for ejecting at least one bulk product S the movable end 512 of the first ejection unit 51 is displaced in the direction of the fixed supply portion 3 and the movable end 522 of the second ejection unit 52 is displaced in the direction of the fixed discharge portion 4. Good results can be achieved if the conveyor belt 514 of the first ejection unit 51 is braked in order to decelerate the bulk products which are supplied from the fixed supply portion 3 for ejection while the movable end 512 of the first ejection unit 51 is moved back in the direction of the fixed supply portion 3. At the same time, the conveyor belt 524 of the second ejection unit 52 is accelerated in order to discharge the remaining bulk products 2 to the fixed discharge portion 4 while the movable end 522 of the second ejection unit 52 is moved back in the direction of the fixed discharge portion 4.

Figure 3:
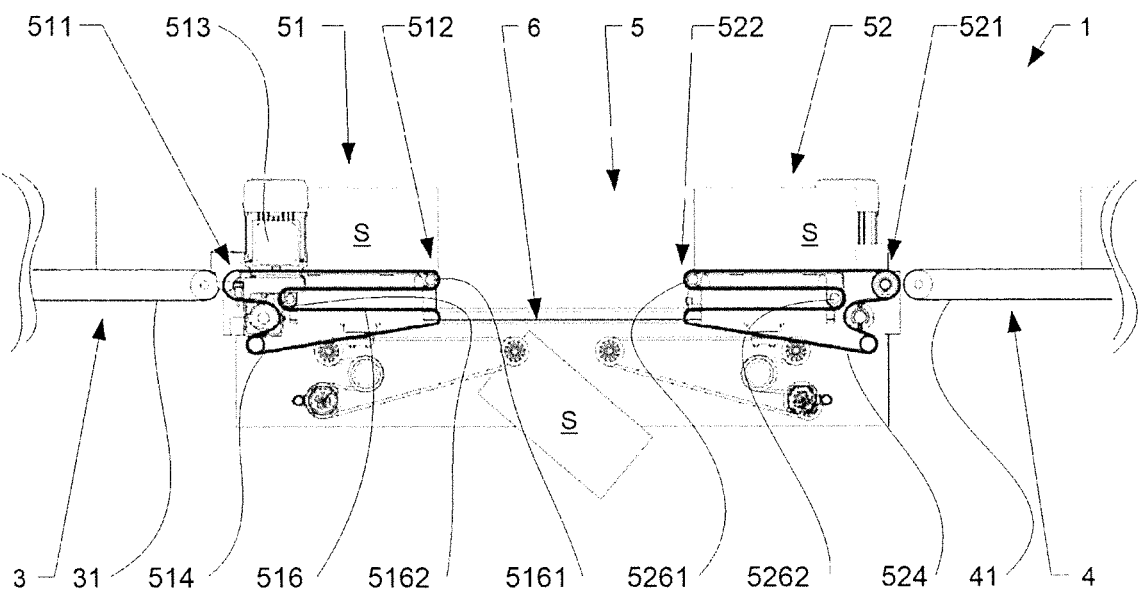
FIG. 3 shows a side view of the variant of the transport device according to FIG. 1 in an open state.
Figure 4:
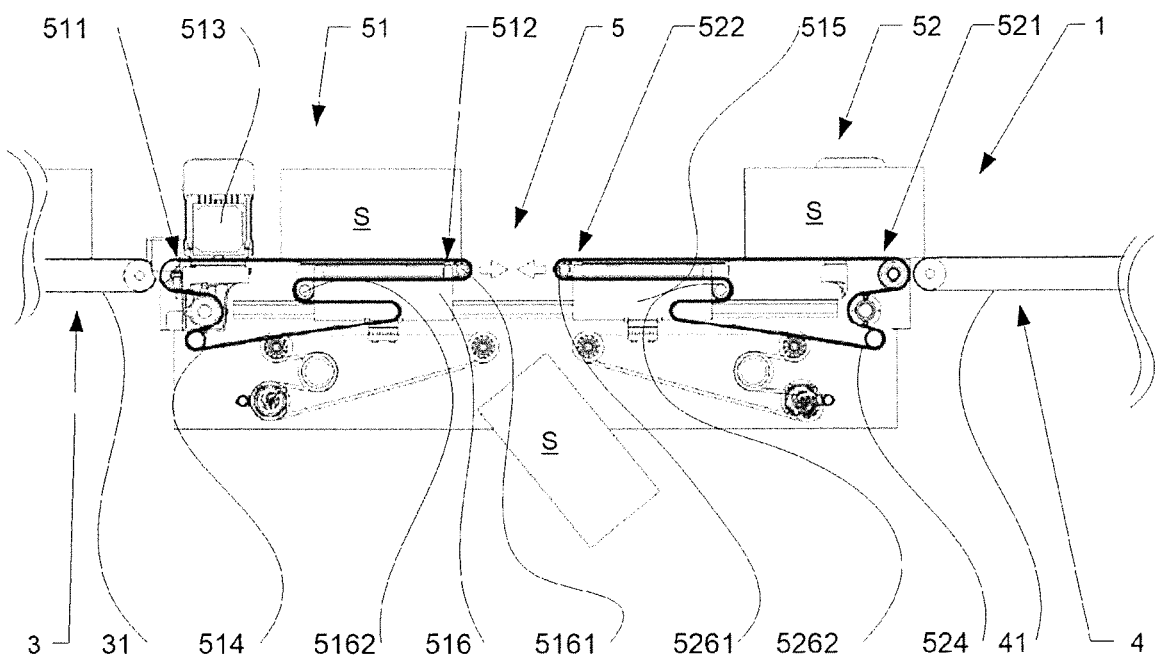
FIG. 4 shows a side view of the variant of the transport device according to FIG. 1 in a state when the movable end of the first ejection unit and the movable end of the second ejection unit are moved together.

As can best be seen in FIG. 3, the bulk products S which are intended to be ejected fall through a gap 6 which is produced between the first ejection unit 51 and the second ejection unit 52 downward out of the transport device 1. During the approach of the movable end 512 of the first ejection unit 51 and the movable end 522 of the second ejection unit 52 as shown in FIG. 4, the remaining bulk products S are discharged by means of the fixed discharge portion 4.

The at least one sensor 7 which is connected in terms of communication to the control unit 900 sends data thereto, wherein the control unit 900 is configured to control the respective drive motor 513, 523 on the basis of the data in order to accelerate and/or decelerate the respective conveyor belt 514, 524. The shown sensor 7 is typically configured to detect the respective effective length of the bulk products S and the respective position of the bulk products S on the fixed supply portion 3 in the conveying direction and the control unit 900 is configured to control the linear units 515, 525 on the basis of the respective effective length in such a manner that between the movable end 512 of the first ejection unit 51 and the movable end 522 of the second ejection unit 52 there can be generated a gap 6, which allows the bulk products S to be ejected in terms of size. Furthermore, the sensor 7 can be configured to detect the respective position of the bulk products S on the fixed supply portion 3 and the control unit 900 is configured to accelerate the drive motor 523 of the second ejection unit 52 by means of the data transmitted by the sensor in such a manner that the bulk products S are spaced apart and, during the transfer from the second ejection unit 52 to the fixed discharge portion 4 with respect to the respective bulk products S which follow in an upstream direction, have a greater actual spacing than the actual spacing during the transfer from the fixed supply portion 3 to the first ejection unit 51.

Good results can be achieved if the sensor 7 is configured to detect the respective position of the bulk products S on the fixed supply portion 3 and the control unit 900 is configured to control the drive motor 513 of the first ejection unit 51 by means of the data which is transmitted by the sensor 7 in such a manner that the first ejection unit 51 is decelerated in order to eject the bulk products S which are intended to be ejected. Furthermore, the control unit 900 can control the respective linear unit 515, 525 by means of the data transmitted by the sensor 7 in such a manner that the first ejection unit 51 and the second ejection unit 52 for ejection are displaced so quickly that the bulk products S which are intended to be ejected fall out in a downward direction through the gap 6 produced as a result of the mass thereof in a manner driven by gravitational force.

In the embodiment according to FIG. 1, a control sensor 18 is arranged in the region of the movable end 522 of the second ejection unit 52 and is no longer illustrated in the additional Figures. The control sensor 18 is configured to monitor the ejection by detecting, for example, bulk products which are jammed between the movable ends 512, 522 of the first ejection unit 51 and the second ejection unit 52 or which block this region for another reason. For example, this could be the case if the already ejected bulk products have not been transported away and are stacked under the movable ends.

Figure 5:
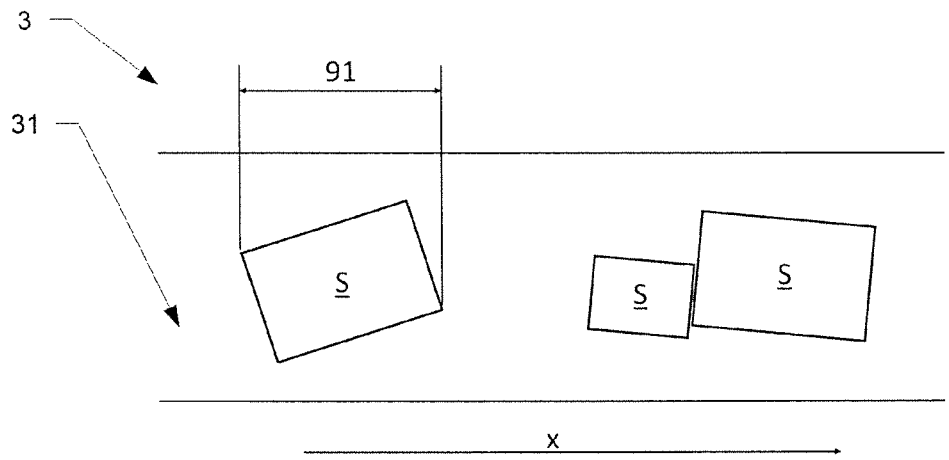
FIG. 5 shows a plan view of a variant of the fixed supply portion with supplied bulk products located thereon.
Figure 6:
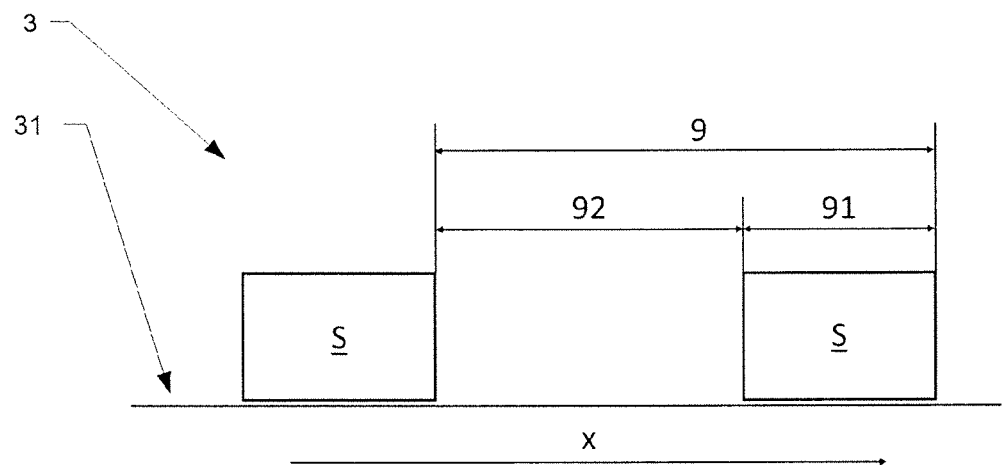
FIG. 6 shows a side view of the variant of the fixed supply portion according to FIG. 5 with supplied bulk products located thereon.

As can be seen in FIGS. 5 and 6, the bulk products S are typically supplied in a discontinuous product flow. The supplied bulk products conventionally have different dimensions, such as width and length dimensions.

As can be seen in FIG. 5, the effective length 91 of the respective bulk products S does not correspond to the actual dimensions such as length or width but instead, depending on the position on the supply portion 3, corresponds to the actually measured length in the conveying direction x. The term "effective length" 91 is intended to be understood to be the length measured in the conveying direction x of the bulk products. As can further be seen in FIG. 5, two or more bulk products can also be supplied in a state adjacent to each other or one on the other. In a preferred variant of the transport device, the sensor 7 is configured in such a manner that two bulk products which are supplied adjacent to each other are recognized in order to initiate an ejection operation.

As can be seen in FIG. 6, in the variant shown of the transport device 1 an actual length 9 can be detected by the sensor 7 and corresponds to the effective length 91 of the respective bulk products S and the actual spacing 92 between the bulk products S and the bulk products S which follow in the downstream direction. If a tray conveyor is arranged downstream of the transport device, for example, the actual length 9 should substantially correspond to the length of a conveying tray and the spacing between two consecutive conveying trays.

Figure 7:
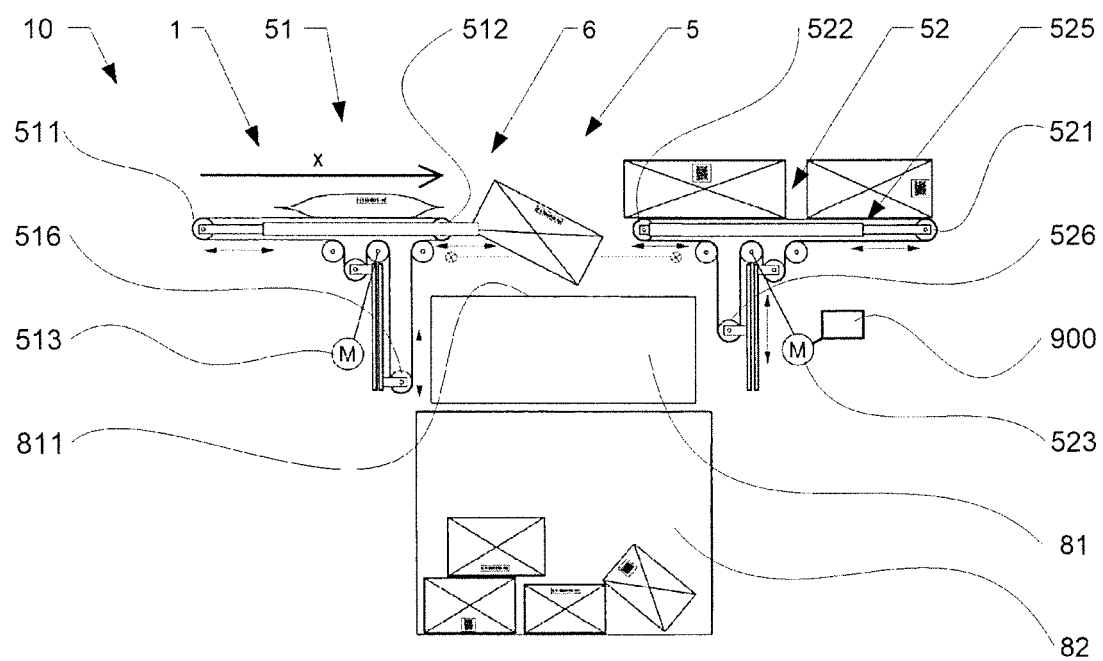
FIG. 7 shows a side view of a first variant of a sorting facility having a transport device and a sorting device.
Figure 8:
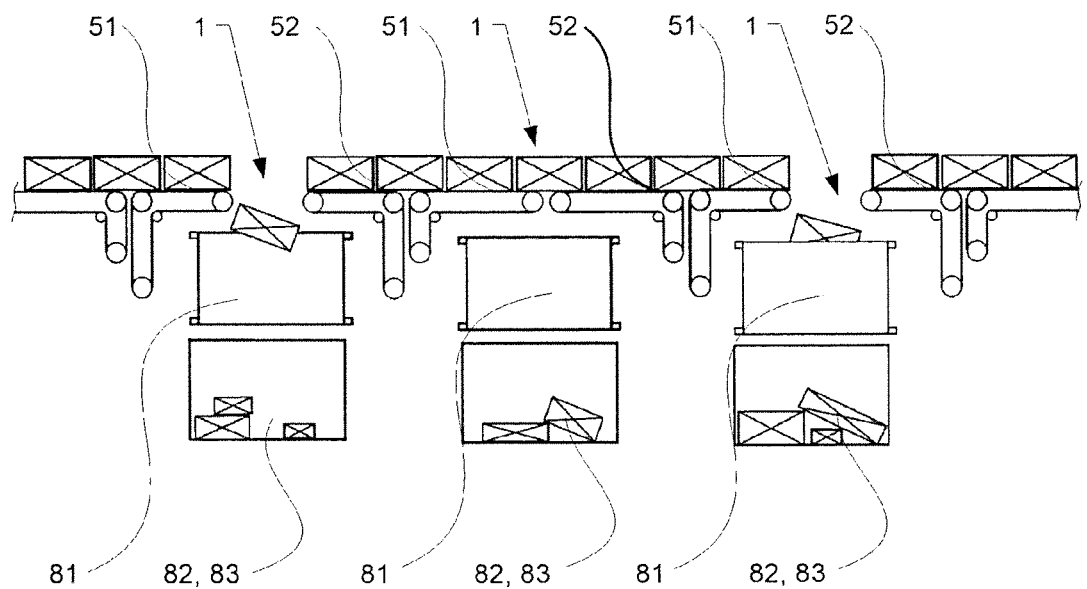
FIG. 8 shows a side view of the sorting device according to FIG. 7 with a plurality of transport devices and sorting devices.

As can be seen in FIGS. 7 and 8, the shown embodiment of the sorting facility 10 for transporting and sorting bulk products S comprises at least one transport device 1 and sorting device 8 in order to also allow the ejected bulk products S to be sorted in addition to simply being ejected.

The sorting facility 10 shown also comprises in place of a fixed supply portion and discharge portion an additional transport device 1 in an upstream and/or downstream direction. In the variant shown, the sorting facility 10 comprises a plurality of transport devices 1 which are arranged adjacent to each other in the conveying direction x in a row.

The transport device 1 shown comprises an ejection device 5 which comprises a first ejection unit 51 and a second ejection unit 52. The first ejection unit 51 and second ejection unit 52 each define a transport surface 515, 525, wherein the first ejection unit 51 in the variant shown comprises a first movable end 511 and a second movable end 512 which is arranged downstream thereof.

As can be seen in particular in FIG. 7, the first movable end 511 and the second movable end 512 are arranged so as to be displaceable in the conveying direction x by means of a linear unit. The empty strand of the conveyor belts 514, 524 which is produced when the movable ends 512, 522 are moved apart can be tensioned by means of tension rollers 516, 526 under the transport surfaces 515, 525 by the tension rollers 516, 526 being displaced perpendicularly with respect to the respective transport surface 515, 525. The tension rollers 516, 526 can in this instance be displaced by means of drive motors which can be controlled via a control unit 900. The first ejection unit 51 and the second ejection unit 52 comprise in the variant shown a drive unit 513, 523 for independently driving the ejection unit 51, 52, respectively. As can be seen in the Figures a gap 6 through which bulk products S which are intended to be ejected are ejected in the variant shown downward out of the transport device 1 is generated by moving apart the movable end 512 of the first ejection unit 51 and the movable end 522 of the second ejection unit 52. Preferably, the bulk products S fall out of the transport device 1 during ejection with respect to the transport surfaces 515, 525 in a downward direction and land on the movable sorting element 81, which is arranged under the transport surfaces 515, 525, of the sorting device 8 and are sorted into at least one collection container 82, 83 by means of the movable sorting element 81.

The shown sorting facility 10 further comprises a sorting device 8 for sorting the ejected bulk products S. The shown sorting device 8 comprises a movable sorting element 81 and at least two collection containers 82, 83. In order to obtain a structure which is as compact as possible, the at least two collection containers 82, 83 can be arranged under the transport device 1. The two collection containers 82, 83 shown are in this instance not arranged beside the first ejection unit 51 and the second ejection unit 52 but instead arranged underneath.

Figure 9:
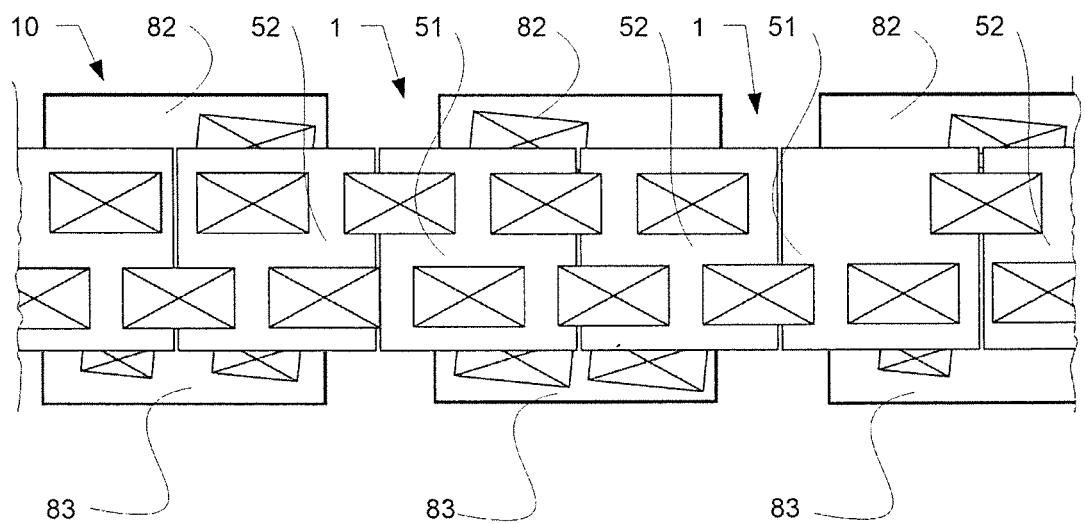
FIG. 9 shows a plan view of the sorting device according to FIG. 7 with a plurality of transport devices and sorting devices.

FIG. 9 shows a plan view of the sorting facility 10 having a plurality of transport devices 1 and sorting devices. As can be seen in FIG. 9, at least two flows of products can be transported parallel with each other. Preferably, the flows of products comprising a plurality of bulk products as in the variant shown are transported in the conveying direction x in a manner offset relative to each other. As a result of the offset transport relative to each other, at an identical conveying speed between 40% and 60% more bulk products S can be transported, ejected and sorted.

As can be seen in FIGS. 10 to 16, the at least one movable sorting element 81 of the sorting device 8 comprises an edge 811 in order to sort the ejected bulk products S between the at least two collection containers 82, 83 under the transport surfaces 515, 525. The edge 811 of the at least one movable sorting element 81 can be brought from a first position P1 into a second position P2 on a curved path with respect to an apex SP arranged under the transport surfaces 515, 525 in order to sort the bulk products S with respect to the conveying direction x at one of the sides into one of the at least two collection containers 82, 83. The edge 811 preferably extends substantially parallel with the conveying direction x and is also arranged under the transport surfaces 515, 525.

Figure 10:
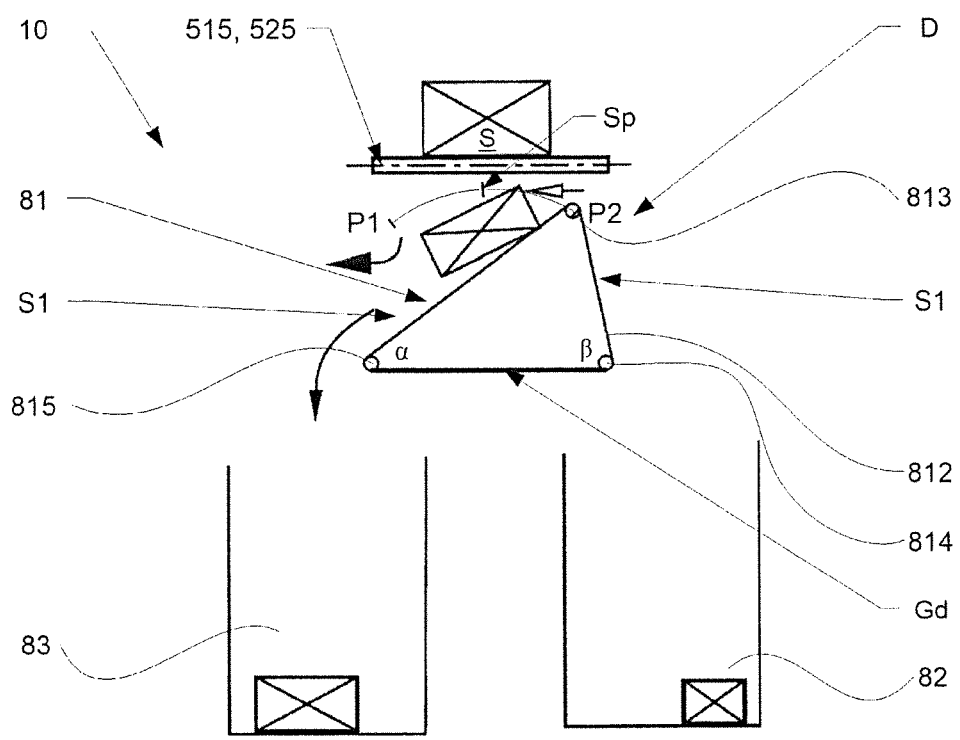
FIG. 10 shows a cross section of the sorting facility in the conveying direction according to FIG. 7.

FIG. 10 shows a variant of the sorting facility 10 in which the movable sorting element 81 of the sorting device 8 is in the form of a sorting belt 812 which defines, in the viewing direction of the conveying direction x, a triangle D, the sides S1, S2 of which form sliding surfaces. The sorting belt 812 runs in the shown variant around at least three rollers 813, 814, 815, wherein one of the rollers 813 is arranged so as to be displaceable on the curved path B from the first position P1 into the second position P2. The sorting belt 812 itself cannot be driven in the variant shown. The ejected bulk products S slide down over the sorting belt 812 and fall into one of the two collection containers 82, 83. In order to establish in which of the two collection containers 82, 83 the ejected bulk product S is sorted, the uppermost roller or cylinder 813 of the triangle D is moved from the first position P1 into the second position P2, or vice versa, with respect to the apex SP.

Figure 11:
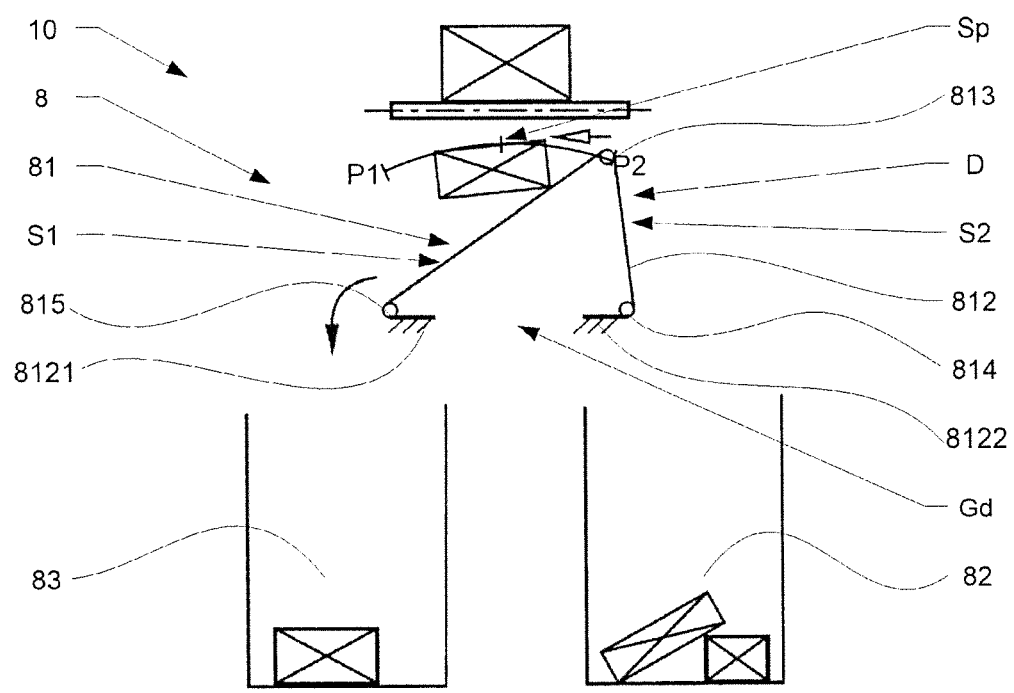
FIG. 11 shows a cross section of a second variant of a sorting facility in the conveying direction having a transport device and a sorting device.

FIG. 11 shows a second variant of the sorting facility 10, in which the movable sorting element 81 of the sorting device 8 is in the form of a sorting belt 812. The sorting belt 812 of the conveying direction x also defines a triangle D, the sides S1, S2 of which form sliding surfaces.

In the variant shown, the sorting belt 812 also runs around three rollers 813, 814, 815, but wherein only one of the rollers 813 is arranged on the curved path B so as to be displaceable from the first position P1 into the second position P2.

The remaining rollers 814, 815 are arranged in a fixed manner. The sorting belt 812 is also securely clamped at two ends 8121, 8122 and therefore fixed. The length variation of the sorting belt 812 when the uppermost roller or cylinder 813 is moved along the curved path B is carried out in the variant shown only via a resilient and therefore reversible expansion of the sorting belt 812. Since, in the variant shown, the sorting belt 812 cannot be driven, the ejected bulk products S slide down over the sorting belt 812 and fall into one of the two collection containers 82, 83.

In order to establish, in which of the two collection containers 82, 83 the ejected bulk products S are sorted, the uppermost roller or cylinder 813 of the triangle D is also moved in this instance with respect to the apex SP from the first position P1 into the second position P2.

Figure 12:
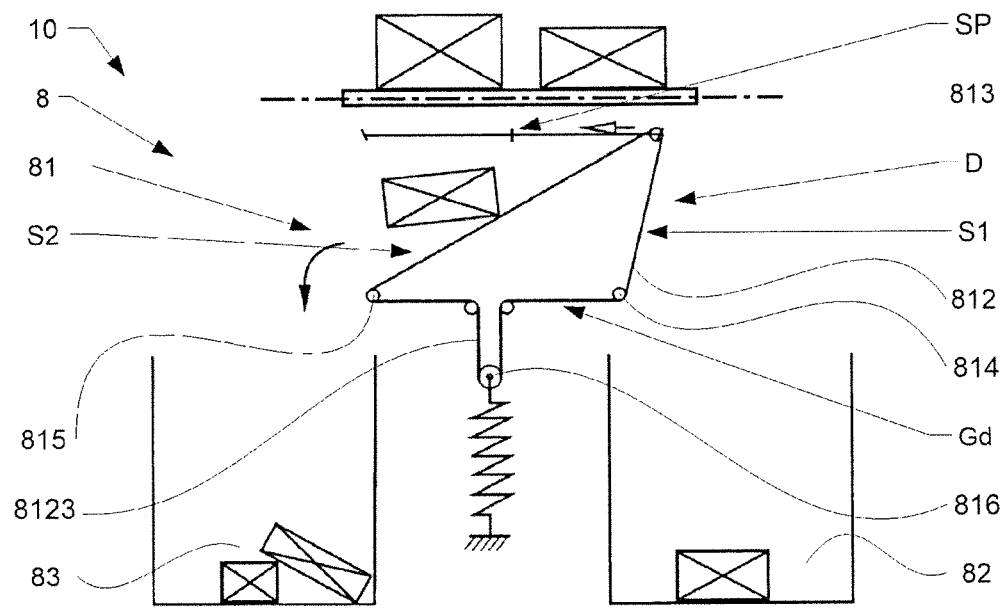
FIG. 12 shows a cross section of a third variant of a sorting facility in the conveying direction having a transport device and a sorting device.

FIG. 12 shows a third variant of the sorting facility 10, in which the movable sorting element 81 of the sorting device 8 is in the form of a sorting belt 812. The sorting belt 812 defines in the viewing direction of the conveying direction x a triangle, the sides S1, S2 of which form sliding surfaces. The sorting belt 812 runs in the variant shown around at least three rollers 813, 814, 815, wherein one of the rollers 813 is arranged on the curved path B so as to be displaceable from the first position P1 into the second position P2. In the variant shown, the sorting belt 812 itself also cannot be driven but is tensioned by means of at least one additional tension roller 816. In this case, the empty strand 8123 is tensioned by the at least one tension roller 816 being displaced perpendicularly.

The ejected bulk products S slide down over the sorting belt 812 and fall into one of the two collection containers 82, 83. In order to establish in which of the two collection containers 82, 83 the ejected bulk products S are sorted, the uppermost roller or cylinder 813 of the triangle D is moved from the first position P1 into the second position P2 with respect to the apex SP. In this instance, the uppermost roller or cylinder 813 is also moved on the curved path B substantially parallel with the base side GD of the triangle D. By moving the uppermost roller or cylinder 813 in one of the two positions P1, P2, the side at which the bulk products S are sorted is controlled.

Figure 13:
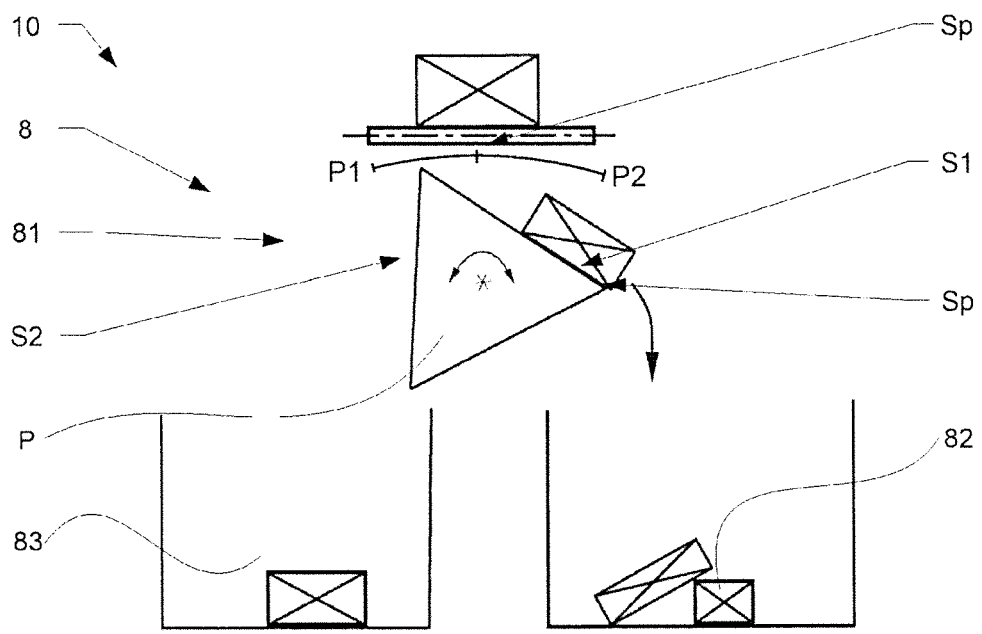
FIG. 13 shows a cross section of a fourth variant of a sorting facility in the conveying direction having a transport device and a sorting device.

FIG. 13 shows a fourth variant of the sorting facility 10, in which the movable sorting element 81 of the sorting device 8 in the viewing direction of the conveying direction x is in the form of a pivotable prism P. In order to sort the bulk products S, the prism P shown is pivoted with respect to the apex SP in order to sort the bulk products S into one of the at least two collection containers 82, 83.

In the variant shown, the prism P is in the form of a triangle, preferably an equilateral triangle. The side faces S1, S2 of the triangle D constitute sliding surfaces in this case. In order to achieve a sorting process which is particularly time-saving and selective, the prism P can be pivoted at the same time as the ejection operation. In this case, the bulk products S which fall downward out of the ejection device 5 are detected by the pivoting prism P, slide down over the respective sliding surface and can further be accelerated by the pivoting movement and be ejected into one of the at least two collection containers 82, 83.

Figure 14:
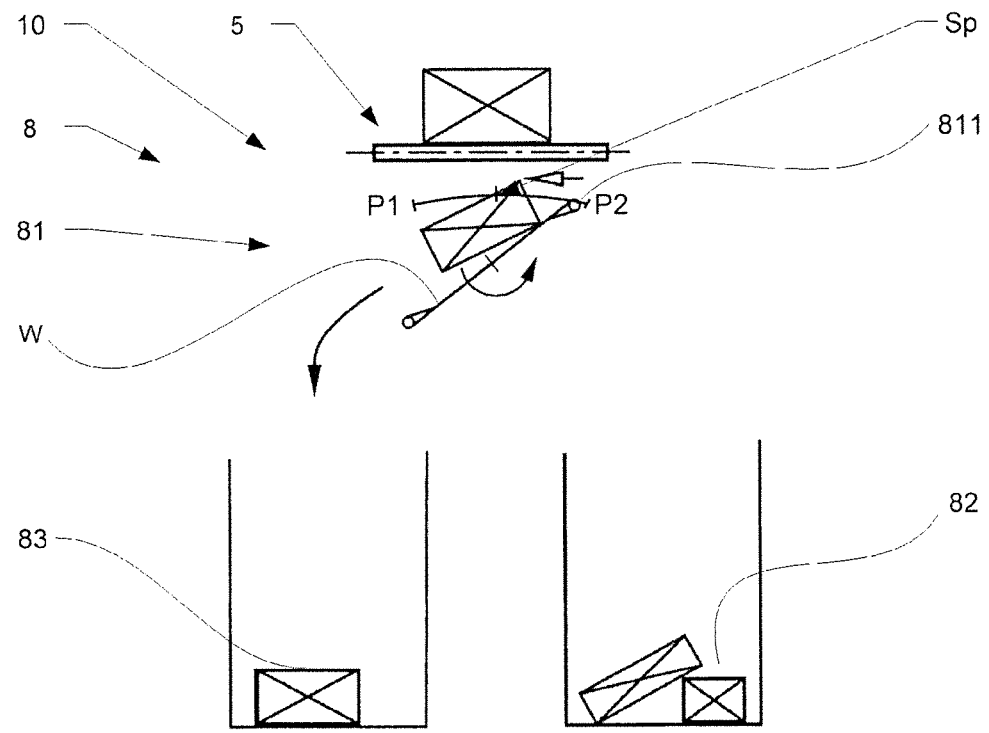
FIG. 14 shows a cross section of a fifth variant of a sorting facility in the conveying direction having a transport device and a sorting device.

FIG. 14 shows a fifth variant of the sorting facility 10, in which the movable sorting element 81 of the sorting device 8 is in the form of a seesaw W. The seesaw W shown is pivoted with respect to the apex SP when the bulk products S are ejected in order to sort the bulk products S into one of the at least two collection containers 82, 83. In this case, the seesaw W is pivoted with respect to a rotation location DP which is preferably arranged under the apex SP. In order to achieve a sorting process which is particularly time-saving and selective, the seesaw W can be pivoted at the same time as the ejection operation. In this case, the bulk products S which fall downward out of the ejection device 5 are detected by the seesaw W which pivots between the first position P1 and the second position P2, slide down over the sliding surface of the seesaw W and are further accelerated by the pivot movement of the seesaw W and ejected into one of the at least two collection containers 82, 83.

The seesaw W is preferably pivotable from the first position P1 into the second position P2 in a manner rotating about the rotation location DP, wherein a first edge 811 of the seesaw W crosses the apex SP during pivoting from the first position P1 into the second position P2.

Figure 15:
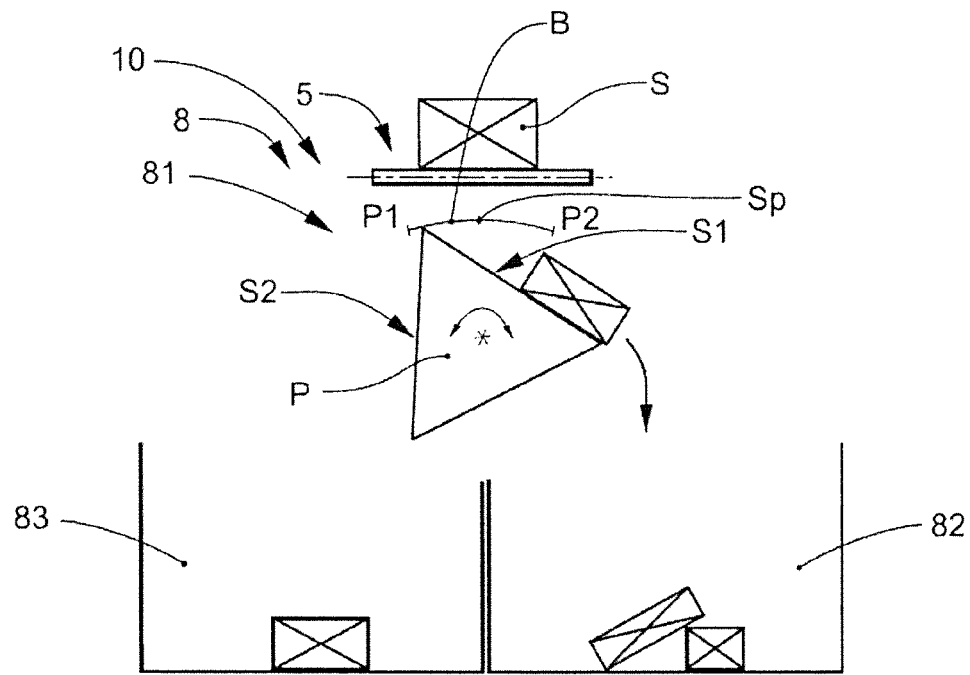
FIG. 15 shows a cross section of a sixth variant of a sorting facility in the conveying direction having a transport device and a sorting device.

FIG. 15 shows a sixth variant of the sorting facility 10, in which the movable sorting element 81 of the sorting device 8 in the viewing direction of the conveying direction x is in the form of a pivotable prism P, similarly to the fourth embodiment. The shown prism P is pivoted with respect to the apex SP for sorting the bulk products S in order to sort the bulk products S into one of the at least two collection containers 82, 83.

In the variant shown, the prism is in the form of an equilateral triangle.

Unlike the fourth variant, the at least two collection containers 82, 83 are arranged adjacent to each other and under the transport device 1 in order to achieve a very space-saving construction. In order nevertheless to achieve a selective sorting process, the prism P is pivoted at the same time as the ejection operation, but it is not accelerated in addition by the pivot movement in order not to eject the bulk products S beyond one of the at least two collection containers 82, 83.

Figure 16:
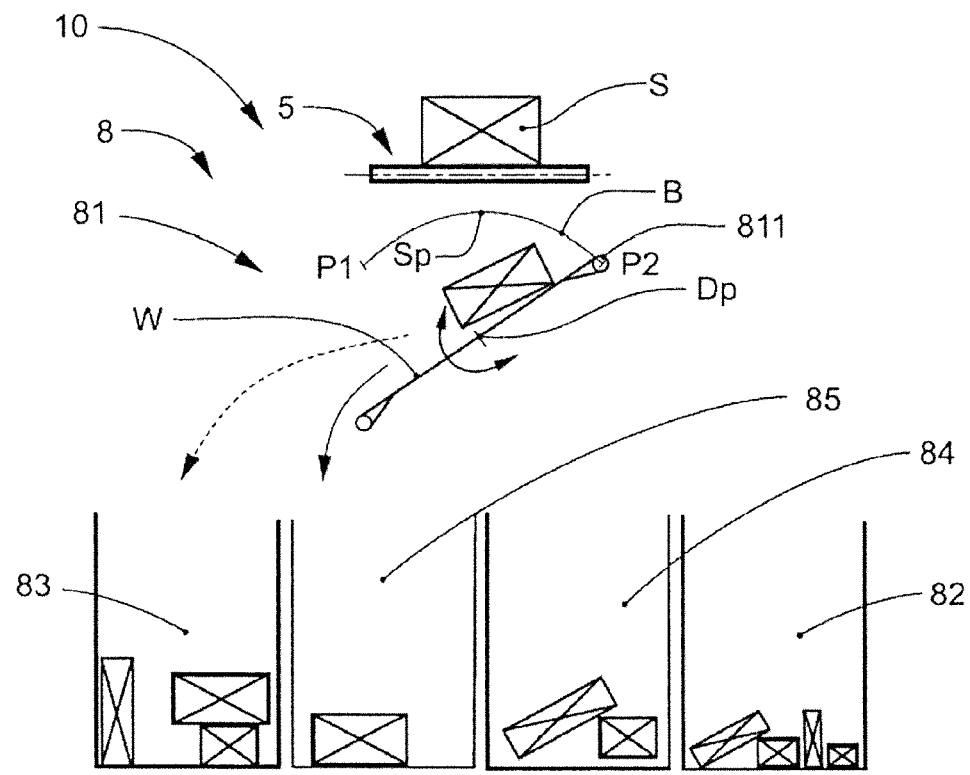
FIG. 16 shows a cross section of a seventh variant of a sorting facility in the conveying direction having a transport device and a sorting device.

FIG. 16 shows a seventh variant of the sorting facility 10, in which the movable sorting element 81 of the sorting device 8 is in the form of a seesaw W. The seesaw W shown is pivoted with respect to the apex SP when the bulk products S are ejected in order to sort the bulk products S into one of the at least two collection containers 82, 83, 84, 85. The sorting device shown comprises a total of four collection containers 82, 83, 84, 85.

The bulk products S which fall downward out of the ejection device 5 are detected by the seesaw W which pivots between the first position P1 and the second position P2, but does not only slide down over the sliding surface of the seesaw W but is further accelerated by the pivot movement of the seesaw W and ejected selectively into one of the four collection containers 82, 83, 84, 85.

The seesaw W can be pivoted from the first position P1 into the second position P2 so as to rotate about the rotation location DP, wherein a first edge 811 of the seesaw W crosses the apex SP during pivoting from the first position P1 into the second position P2.

It is claimed:

1. A transport device (1) for transporting bulk products (S), comprising:
   a. a fixed supply portion (3) and a fixed discharge portion (4) which is arranged downstream in a conveying direction (x) and
   b. an ejection device (5) comprising a first ejection unit (51) and a second ejection unit (52) which are arranged in the conveying direction (x) between the fixed supply portion (3) and the fixed discharge portion (4), wherein
      i. the first ejection unit (51) comprises a fixed or movable end (511) which is arranged adjacent to the fixed supply portion (3) and a movable end (512) which is arranged downstream thereof, and
      ii. the second ejection unit (52) comprises a movable end (522) which is arranged adjacent to and downstream of the first ejection unit (51) and a fixed or movable end (521) which is arranged downstream thereof adjacent to the fixed discharge portion (4), wherein
   c. the first ejection unit (51) and the second ejection unit (52) each comprise a drive unit (513, 523) for independently driving the respective ejection unit (51, 52) and by moving apart the movable end (512) of the first ejection unit (51) and the movable end (522) of the second ejection unit (52) a gap (6) can be generated through which bulk products (S) which are intended to be ejected are ejected from the transport device (1), wherein the first ejection unit (51) and the second ejection unit (52) each comprise a conveyor belt (514, 524) which can be driven by means of an individual drive motor (513, 523), which belts each define a transport surface (515, 525), wherein a respective empty strand (5141, 5142, 5241, 5242) of the conveyor belts (514, 524), when a movable end (511, 512, 521, 522) is displaced, can be tensioned by means of a tension element (516, 517, 526, 527) under the transport surfaces (515, 525) by the tension element (516, 517, 526, 527) being able to be displaced, preferably perpendicularly, with respect to the respective transport surface (515, 525) at an angle from 30° to 90°.

2. The transport device (1) as claimed in claim 1, wherein the transport device (1) comprises at least one sensor (7) and a control unit (900) which is communicatively connected to the sensor (7), wherein the control unit (900) is configured to control the acceleration and/or deceleration and the movement apart of the first ejection unit (51) and the second ejection unit (52).

3. The transport device (1) as claimed in claim 2, wherein the (7) is configured to detect the dimensions of the bulk products (S) and the respective sensor position of the bulk products (S) relative to each other on the fixed supply portion (3), wherein the sensor (7) preferably comprises a light barrier, a light grid, a laser grid or a camera.

4. A sorting facility (10) for transporting and sorting bulk products (S), comprising:
   a. at least one transport device (1) as claimed in claim 1, and
   b. a sorting device (8) for sorting the ejected bulk products (S), comprising
      i. at least one movable sorting element (81) and at least one collection container (82, 83, 84, 85), wherein the at least one movable sorting element (81) and the at least one collection container (82, 83, 84, 85) are arranged under the transport surfaces (515, 525) and wherein
      ii. at least one edge (811) of the at least one movable sorting element (81) can be brought from a first position (P1) into a second position (P2) on a linear or curved path (B) with respect to an apex (SP) which is arranged under the transport surfaces (515, 525) in order to sort the bulk products (S) with respect to the conveying direction (x) at one of the sides into the at least one collection container (82, 83, 84, 85).

5. The sorting facility (10) as claimed in claim 4, wherein the movable sorting element (81) comprises a sorting belt (812) which defines in a viewing direction of the conveying direction (x) a triangle (D), the sides (S1, S2) of which form sliding surfaces for an ejected bulk product (S).

6. The sorting facility (10) as claimed in claim 5, wherein by positioning the edge (811) with respect to the apex (SP) in the first position (P1) or in the second position (P2), the side at which the bulk product (S) is sorted over one of the sliding surfaces can be adjusted.

7. The sorting facility (10) as claimed in claim 6, wherein, by laterally moving the edge (811) with respect to the apex (SP), the respective angle ($\alpha$, $\beta$) of the sides (S1, S2) and thereby the inclination of the sliding surfaces can be adjusted.

8. The sorting facility (10) as claimed in claim 4, wherein the movable sorting element (81) in the viewing direction of the conveying direction (x) is in the form of a pivotable prism (P), wherein one of the edges (811) can be pivoted with respect to the apex (SP) in order to sort the bulk product (S) into the at least one collection container (82, 83).

9. The sorting facility (10) as claimed in claim 8, wherein the pivotable prism (P) is arranged so as to be pivotable about a rotation location (DP) in order to sort the bulk products (S).

10. The sorting facility (10) as claimed in claim 4, wherein the movable sorting element (81) is in the form of a seesaw (W), wherein one of the edges (811) can be pivoted with respect to the apex (SP) in order to eject the bulk products (S) in order to sort the bulk products (S) into the at least one collection container (82, 83, 84, 85).

11. The sorting facility (10) as claimed in claim 4, wherein during ejection the at least one edge (811) runs through the apex (SP) on the path from the first position (P1) into the second position (P2) or from the second position (P2) into the first position (P1).

12. A method for transporting and sorting bulk products (S) with a transport device (1) comprising the steps of:
   a. supplying the bulk products (S);
   b. ejecting at least one bulk product (S) by means of an ejection device (5), wherein
      i. a movable end (512) of a first ejection unit (51) is displaced in a conveying direction (x), and
      ii. a movable end (522) of a second ejection unit (52) is displaced in the conveying direction (x), and
      iii. the bulk products (S) which are intended to be ejected are ejected from the transport device (1) through a gap (6) which is produced between the first ejection unit (51) and the second ejection unit (52);
   c. sorting the ejected bulk products (S) by an edge (811) of at least one movable sorting element (81) being brought from a first position (P1) into a second position (P2) with respect to an apex (SP) which is arranged under transport surfaces (515, 525) on a linear or curved path (B) in order to sort the bulk products (S) with respect to the conveying direction (x) at one of the sides into at least one collection container (82, 83, 84, 85),
   d. discharging the bulk products (S) which remain on the transport device (1).

13. The method as claimed in claim 12, wherein the bulk products (S) fall downward out of the sorting device (10) during ejection with respect to the transport surfaces (515, 525).

14. The method as claimed in claim 12, wherein the movable sorting element (81) is in the form of a sorting belt (812) which defines, in the viewing direction of the conveying direction (x), a triangle (D), the sides (S1, S2) of which form sliding surfaces, wherein an edge (811) with respect to the apex (SP) from the first position (P1) into the second position (P2) is controlled, at which side the bulk products (S) are sorted over one of the sliding surfaces.

15. The method as claimed in claim 14, wherein, by laterally moving the edge (811) with respect to the apex (SP), the respective angle ($\alpha$, $\beta$) of the sides (S1, S2) and thereby the inclination of the sliding surfaces is controlled.

16. The method as claimed in one of claim 14, wherein the bulk products (S) are sorted into the at least one collection container (82, 83, 84, 85) after ejection by sliding down on one of the sliding surfaces.

17. The method as claimed in claim 12, wherein the movable sorting element (81) in the viewing direction of the conveying direction (x) is in the form of a pivotable prism (P), wherein one of the edges (811) is pivoted with respect to the apex (SP) in order to sort the bulk products (S) into the at least one collection container (82, 83, 84, 85).

18. The method as claimed in claim 12, wherein the movable sorting element (S) is in the form of a seesaw (W), wherein one of the edges (811) for ejecting the bulk products (S) is pivoted with respect to the apex (SP) in order to sort the bulk products (S) into the at least one collection container (82, 83).

19. The method as claimed in claim 12, wherein the movable sorting element (S) for sorting is accelerated in order to eject the bulk products (S) into the at least one collection container (82, 83, 84, 85).

* * * * *